No. 715,956. Patented Dec. 16, 1902.
H. BODENSTEIN.
ICE PLANING KNIFE.
(Application filed Apr. 10, 1902.)
(No Model.)
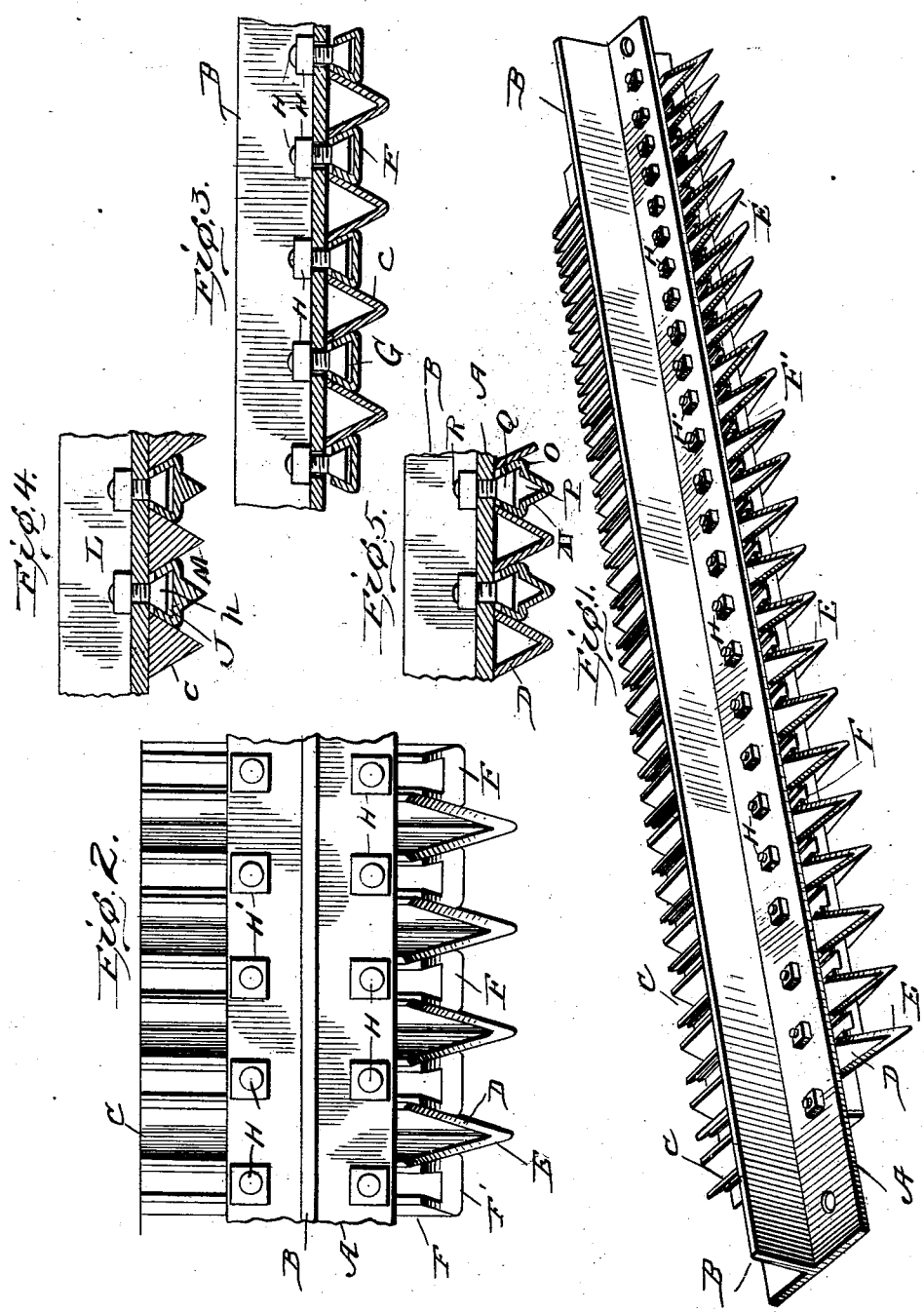

UNITED STATES PATENT OFFICE.

HENRY BODENSTEIN, OF ARLINGTON, MASSACHUSETTS, ASSIGNOR TO WILLIAM T. WOOD & COMPANY, OF ARLINGTON, MASSACHUSETTS, A FIRM.

ICE-PLANING KNIFE.

SPECIFICATION forming part of Letters Patent No. 715,956, dated December 16, 1902.

Application filed April 10, 1902. Serial No. 102,322. (No model.)

*To all whom it may concern:*

Be it known that I, HENRY BODENSTEIN, a citizen of the United States, residing at Arlington, in the county of Middlesex and State of Massachusetts, have invented certain new and useful Improvements in Ice-Planing Knives, of which the following is a specification.

My invention relates to improvements in ice-planing knives, and refers particularly to a planing-knife adapted for use upon elevators for planing the ice to proper shape before it is stored in the ice-houses.

One object of my invention is the provision of an ice-planing knife which will permit of the blades or cutters being easily adjusted, removed, or applied.

Another object of my invention is the provision of a planing-knife the blades of which will make a cut or passage in the ice which will have a rounding bottom to prevent the accumulation of dirt and which will enable the ice to be easily freed of foreign substances.

Another object of my invention is the provision of a planing-knife the securing means of which will never come in contact with the ice, and thus cannot be injured, also will not permit the gathering of dirt or foreign matter, and which securing and adjusting means will be easy of access.

Another object of my invention is the provision of an ice-planing knife which will be the embodiment of simplicity, durability, and inexpensiveness and which will be efficient and practical for the intended purposes.

To attain the objects stated, my invention consists of an ice-planing knife embodying novel features of construction and combination of parts, substantially as disclosed herein.

Figure 1 represents a perspective view of my ice-planing knife complete. Fig. 2 represents a top plan view of a portion of the knife, and Fig. 3 represents a vertical sectional view of the knife. Figs. 4 and 5 represent sectional views of portions of a knife of modified construction.

It will be understood that in use my knife is secured in the carriage carried by the frame of the elevator, and one or more sets of knives may be employed, and my knife consists of the horizontally-disposed plate A, formed with the vertical central rib B, and the plate is secured at its ends to the carriage. Resting upon the under face of the horizontal or foundation plate are the series of substantially triangular-shaped knives or blades C, which have their forward tapering ends D sharpened to form cutting edges E, and these blades are arranged at regular distances apart, and between each angular blade is placed the inverted angular hollow blades F, which receive the conical heads G of the bolts H, said bolts passing through the plate on each side of the central vertical rib and having a nut H', which serves to hold the blades F and cause the blades to bind against the other blades, and thus hold the entire series rigidly in place. The blades F are formed with the forward cutting edges F', which are in rear of the angular cutting edges of the other blades.

In the form of my invention shown in Fig. 4 the intermediate blades are formed with the hollow channel J to receive the head K of the bolt L and have the conical or tapering solid top portion M, and in the form of my invention shown in Fig. 5 the intermediate blades N are formed with the hollow top conical head O and the hollow tapering portion P, in which fits the head Q of the securing-bolts R, as will be understood.

It will be understood that in the form of my knife shown in Figs. 1, 2, and 3 the grooves or corrugations made on the face of the blocks of ice are alternately tapering and smooth faces, while the form of my knife shown in Figs. 4 and 5 makes an even tapering or inclined corrugation. The main blades or cutters are arranged in line, and the intermediate or securing blades or cutters are arranged in line, but in rear of the other or main cutters. It will also be seen that the securing means are entirely concealed and protected by the intermediate hollow blades; but they are easily accessible for purpose of adjustment of the blades or removal or application, as necessity requires. Also my knife makes a cut or corrugation in the ice which has a rounding bottom, and this enables the easy removal of sawdust or other foreign matter from the corrugations. Also my fastening means are of very simple, strong, and durable construction, and generally my improvements make the knife efficient and practical in every particular. At each end of the plate I provide the securing-blocks S to hold the blades in place.

I claim—

1. An ice-planing knife, composed of a frame, a series of main blades or cutters arranged on the under face of the frame, a series of intermediate blades or knives contiguous to the main blades, and securing devices arranged in the intermediate blades for securing all the blades in position, said securing means being concealed by the blades.

2. An ice-planing knife for ice-elevators, composed of a frame, a series of blades carried thereby, and a series of wedging intermediate blades arranged contiguous to the main blades, and devices engaging only the intermediate blades for securing all the blades in proper position.

3. In an ice-planing knife, the combination of a frame, a series of main and intermediate blades carried by the frame, and securing means arranged within the intermediate blades and serving to secure all of said blades and permit proper adjustment of the blades.

In testimony whereof I affix my signature in presence of two witnesses.

HENRY BODENSTEIN.

Witnesses:
  JOE STEDMAN,
  ARTHUR J. WELLINGTON.